(12) United States Patent
Hiraguri et al.

(10) Patent No.: US 11,660,753 B2
(45) Date of Patent: May 30, 2023

(54) CONTROL SYSTEM, CONTROL METHOD, ROBOT SYSTEM, AND STORAGE MEDIUM

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Kazuma Hiraguri, Yokohama (JP); Hirofumi Kawai, Kawasaki (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 389 days.

(21) Appl. No.: 16/909,654

(22) Filed: Jun. 23, 2020

(65) Prior Publication Data
US 2021/0122044 A1    Apr. 29, 2021

(30) Foreign Application Priority Data

Oct. 29, 2019    (JP) .............................. JP2019-196794

(51) Int. Cl.
*B25J 9/16*    (2006.01)
*B25J 9/04*    (2006.01)

(52) U.S. Cl.
CPC ............. *B25J 9/1669* (2013.01); *B25J 9/042* (2013.01); *B25J 9/1602* (2013.01)

(58) Field of Classification Search
CPC ......... B25J 9/1669; B25J 9/042; B25J 9/1602
(Continued)

(56) References Cited

U.S. PATENT DOCUMENTS 3,812,474 A * 5/1974 Linn ................ G05B 19/40935
700/89
5,177,420 A * 1/1993 Wada ................... G05B 19/056
700/86
(Continued)

FOREIGN PATENT DOCUMENTS

EP    1090722 A2 *  4/2001  ............ B25J 9/1682
JP    2000-010614 A    1/2000

OTHER PUBLICATIONS

Ehara et al., "Short-term Development of Software Platform for Robots in Logistics Field Applying Open Source Software", Toshiba Review, vol. 73, No. 1, 2018, pp. 67-71 (with English Abstract).
(Continued)

*Primary Examiner* — Jaime Figueroa
(74) *Attorney, Agent, or Firm* — Oblon, McClelland, Maier & Neustadt, L.L.P.

(57) ABSTRACT

According to one embodiment, a control system controls a robot. The control system includes a first system and a second system. The first system transmits a first command and supplementary data. The first command is represented using a specification different from a control command specification used by a controller of the robot. The supplementary data corresponds to the first command. The second system generates a second command based on the first command, attaches the supplementary data to the second command, and transmits the second command to the controller. The second command corresponds to the control command specification.

14 Claims, 8 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 6,330,493 | B1* | 12/2001 | Takahashi | B25J 9/1682 700/250 |
| 6,442,450 | B1* | 8/2002 | Inoue | B25J 13/00 700/263 |
| 7,742,845 | B2* | 6/2010 | Fink | G05D 1/0246 701/2 |
| 8,050,797 | B2* | 11/2011 | Lapham | B25J 9/161 901/8 |
| 8,761,932 | B2* | 6/2014 | Lapham | G06F 30/00 901/41 |
| 8,977,391 | B2* | 3/2015 | Vavrina | B64G 7/00 701/1 |
| 9,149,931 | B2* | 10/2015 | Kamiya | B25J 13/06 |
| 9,485,895 | B2* | 11/2016 | Kodama | G05B 19/41865 |
| 9,492,925 | B2* | 11/2016 | Aiso | B25J 9/1633 |
| 9,579,797 | B2* | 2/2017 | Apkarian | H04L 67/303 |
| 10,098,269 | B2* | 10/2018 | Kodama | G05B 19/0421 |
| 10,102,177 | B2* | 10/2018 | Yoshida | G06F 13/4282 |
| 10,642,647 | B2* | 5/2020 | Sturtivant | G06F 9/451 |
| 2002/0087232 | A1* | 7/2002 | Lapham | B25J 9/1697 700/245 |
| 2003/0023348 | A1* | 1/2003 | Inoue | B25J 13/00 700/245 |
| 2003/0230998 | A1* | 12/2003 | Miyaji | G05B 19/4148 318/625 |
| 2006/0112034 | A1* | 5/2006 | Okamoto | B25J 9/1697 706/16 |
| 2006/0229801 | A1* | 10/2006 | Fink | G05D 1/0297 701/117 |
| 2013/0066440 | A1* | 3/2013 | Kodama | H05K 13/04 700/9 |
| 2013/0131864 | A1* | 5/2013 | Jody | B25J 9/023 901/23 |
| 2015/0105907 | A1* | 4/2015 | Aiso | B25J 9/1633 901/47 |
| 2015/0148952 | A1* | 5/2015 | Shiratsuchi | B25J 9/1682 901/3 |
| 2015/0283703 | A1* | 10/2015 | Izhikevich | G06N 20/00 700/258 |
| 2015/0321348 | A1* | 11/2015 | Rollinson | B25J 9/065 901/23 |
| 2016/0140077 | A1* | 5/2016 | Yoshida | G06F 13/4282 710/105 |
| 2016/0303739 | A1* | 10/2016 | Apkarian | B25J 9/1689 |
| 2019/0121335 | A1* | 4/2019 | Yoneda | G05B 19/425 |

OTHER PUBLICATIONS

Oga et al., "Force-Sensorless Control Technology Based on Dynamic Model for Industrial Robot Arms", Toshiba Review, vol. 66, No. 5, 2011, pp. 38-41 (with English Abstract).

Hiraguri et al., "Robot Control Techniques Providing Quick, Careful, and Secure Object Gripping Capability", Toshiba Review, vol. 74, No. 4, 2019, pp. 12-15 (with English Abstract).

* cited by examiner

| CONTROL | COMMON COMMAND |
|---|---|
| MOVE | MOVEPTP OR MOVELIN |
| IO OPERATION | GETDIGIN OR SETDIGINALL |
| STATE ACQUISITION | GETSTATUS OR GETERRORSTATUS |
| SERVO OPERATION | SETSRV |

FIG. 4

| CONTROL | COMMON COMMAND | SUPPLEMENTARY DATA FORMAT |
|---|---|---|
| MOVE | MOVEPTP | AXIS NUMBER, ID, MOVEMENT GOAL, VELOCITY, AND ACCELERATION |
| IO OPERATION | GETDIGIN | PORT NUMBER, ADDRESS |
| STATE ACQUISITION | GETSTATUS | ROBOT ID |
| SERVO OPERATION | SETSRV | ON/OFF IDENTIFICATION VALUE |

FIG. 5

CONTROL SYSTEM, CONTROL METHOD, ROBOT SYSTEM, AND STORAGE MEDIUM

CROSS-REFERENCE TO RELATED APPLICATIONS

This application is based upon and claims the benefit of priority from Japanese Patent Application No. 2019-196794, filed on Oct. 29, 2019; the entire contents of which are incorporated herein by reference.

STATEMENT DESIGNATING A GRACE PERIOD DISCLOSURE

The disclosure "Robot Control Techniques Providing Quick, Careful, and Secure Object Gripping Capability" from the Toshiba Review, 2019, vol. 74, No. 4, p 12-15 is a grace period invention disclosure that does not qualify as prior art under 35 U.S.C. § 102(a)(1). That publication names three inventors Hiraguri Kazuma, Kawai Hirofumi, and Nakamoto Hideichi. The overlapping disclosures from that Toshiba Review, 2019, vol. 74, No. 4 publication overlapping with disclosure in the present application was made by the two named inventors of the present application, Hiraguri Kazuma and Kawai Hirofumi. Thereby that Toshiba Review, vol. 74 No. 4 publication is a grace period publication by the present inventors.

FIELD

Embodiments described herein relate generally to a control system, a control method, a robot system, and a storage medium.

BACKGROUND

There is technology in which multiple robots are controlled by a common system. It is desirable to be able to make full use of the capabilities of the robots when controlling by the common system.

BRIEF DESCRIPTION OF THE DRAWINGS

FIG. 4 is a table illustrating examples of the common commands used in the control system according to the embodiment;

FIG. 5 is a table illustrating examples of the formats of the supplementary data used in the control system according to the embodiment;

DETAILED DESCRIPTION

Figure 1:
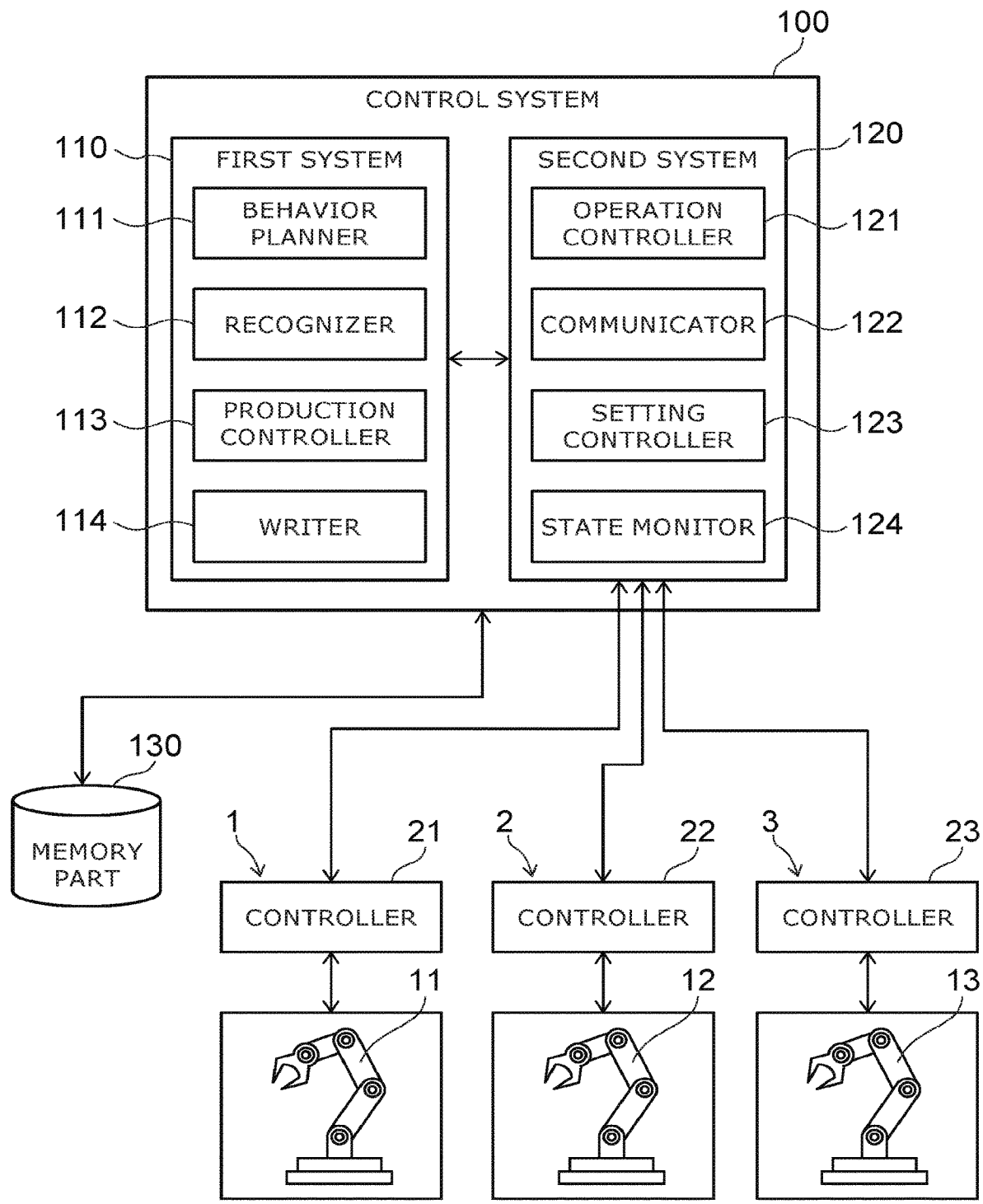
FIG. 1 is a schematic view illustrating a configuration of a control system according to an embodiment.

According to one embodiment, a control system controls a robot. The control system includes a first system and a second system. The first system transmits a first command and supplementary data. The first command is represented using a specification different from a control command specification used by a controller of the robot. The supplementary data corresponds to the first command. The second system generates a second command based on the first command, attaches the supplementary data to the second command, and transmits the second command to the controller. The second command corresponds to the control command specification.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a schematic view illustrating a configuration of a control system according to an embodiment.

As illustrated in FIG. 1, the control system 100 according to the embodiment includes a first system 110, a second system 120, and a memory part 130. The control system 100 according to the embodiment is used to control robots by using a common specification regardless of the control command specifications of the robots.

The first system 110 performs schedule management, recognition, etc., in the control system 100. The second system 120 functions as a lower-level system of the first system 110 and controls the robots according to commands transmitted from the first system 110. The memory part 130 stores data necessary for the processing of the control system 100, data acquired by the control system 100, etc.

In the example illustrated in FIG. 1, at least one of robots 1 to 3 is controlled via the control system 100. The robots 1 to 3 respectively include robot arms 11 to 13 and controllers 21 to 23. The controllers 21 to 23 respectively control the robot arms 11 to 13. The control system 100 transmits a command to at least one of the controllers 21 to 23. The controllers 21 to 23 respectively control the robot arms 11 to 13 according to the commands transmitted from the control system 100.

For example, if the manufacturers of the robots 1 to 3 are different from each other, the control command specifications of the robots 1 to 3 are different from each other. In such a case, the control system 100 transmits commands conforming to the control command specification for each controller. The "control command specification" refers to the command format for controlling the robot represented using dedicated character strings, numerals, etc., fixed independently by each manufacturer. The control of the robot includes, for example, the operations of the robot, modification of system settings of the controller, starting up or stopping a program, etc.

The first system 110 includes, for example, a behavior planner 111, a recognizer 112, a production controller 113, and a writer 114.

The behavior planner 111 refers to a pre-generated plan and manages how and when to operate which robot for each task element. The recognizer 112 collects data transmitted from a camera and other sensors. The collected data shows where the workpiece transferred by the robot is, what kind of state the robot is in, etc.

For example, the memory part 130 stores operation data of various basic operations of the robots. The behavior planner 111 refers to the operation data and corrects the operation data based on the data collected by the recognizer 112. According to the plan and the corrected operation data, the behavior planner 111 transmits commands for operating the robots.

The production controller 113 manages the actual results of the operations of the robots. The behavior planner 111 manages the progress of the tasks by comparing the plan and the actual results managed by the production controller 113.

The writer 114 stores the data acquired by the control system 100 in the database.

The second system 120 includes, for example, an operation controller 121, a communicator 122, a setting controller 123, and a state monitor 124.

The operation controller 121 generates commands transmitted to the controllers of the robots based on the commands transmitted from the first system 110. The communicator 122 performs communication between the second system 120 and the robots. For example, the communicator 122 performs protocol conversion of the data transmitted to the robots and the data received from the robots. The setting controller 123 manages the initial setting values of each operation of the robots. The state monitor 124 monitors the states of the robots.

Figure 2:
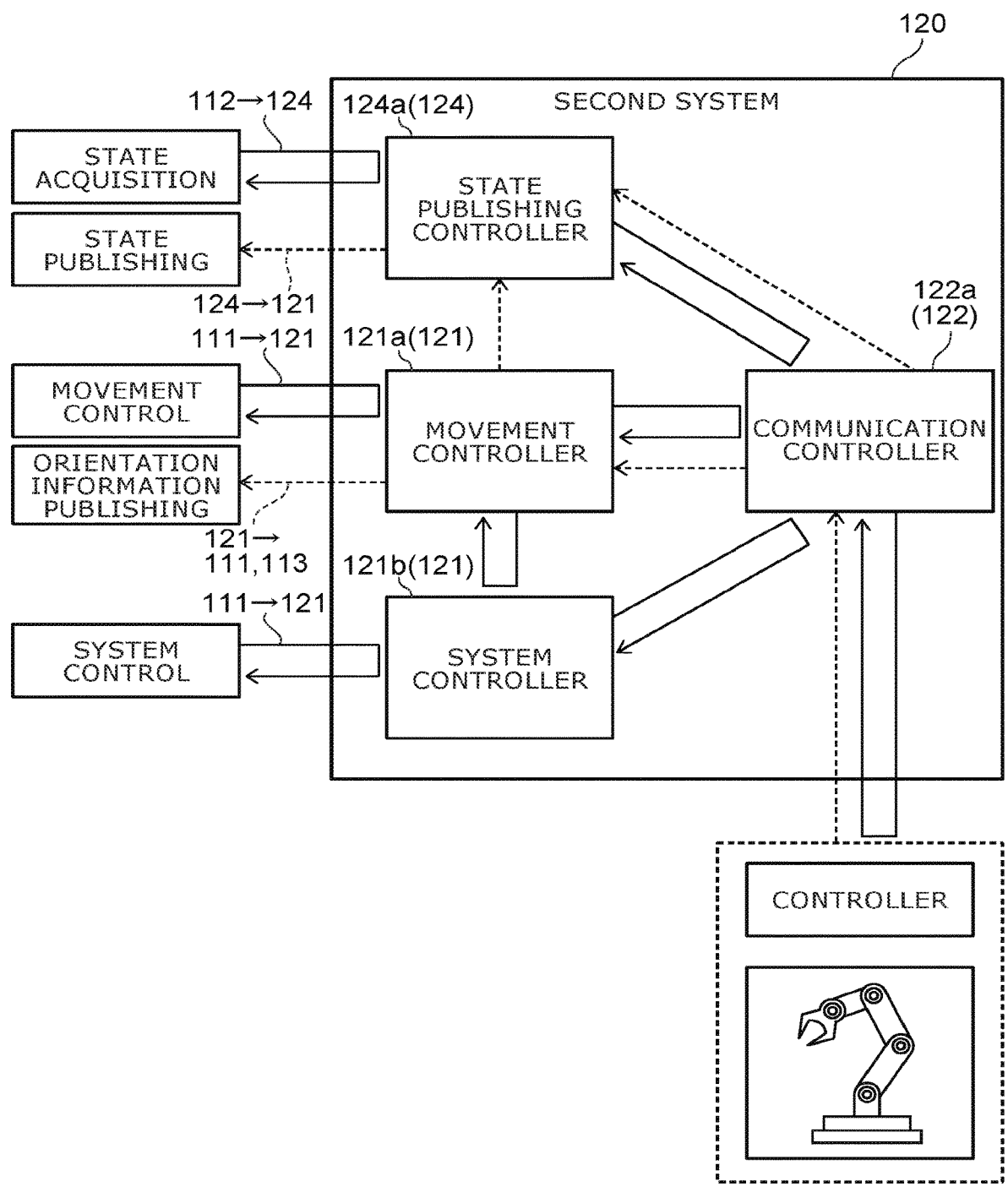
FIG. 2 is a schematic view illustrating specific functions of the control system according to the embodiment.

FIG. 2 is a schematic view illustrating specific functions of the control system according to the embodiment.

An example of the specific functions of the first system 110 and the second system 120 shown in FIG. 1 will now be described with reference to FIG. 2. In FIG. 2, the solid line arrows illustrate control processing. The broken line arrows illustrate event notifications. An event notification is a notification that is spontaneously transmitted to a higher-level section connected in the system when a movement or signal input prespecified in a program occurs, etc.

For example, as illustrated in FIG. 2, the state monitor 124 (shown in FIG. 1) functions as a state publishing controller 124a. The operation controller 121 (shown in FIG. 1) functions as a movement controller 121a and a system controller 121b. The communicator 122 (shown in FIG. 1) functions as a communication controller 122a. The recognizer 112 (shown in FIG. 1) transmits a command to the state publishing controller 124a to publish the state of the robot. When receiving the command, the state publishing controller 124a publishes the state of the robot to the recognizer 112. The recognizer 112 acquires the published state. Also, the state publishing controller 124a publishes the state of the robot to the recognizer 112 when a preset event occurs.

The behavior planner 111 (shown in FIG. 1) transmits commands relating to the movement control and the system control of the robot respectively to the movement controller 121a and the system controller 121b. The movement controller 121a receives the command relating to the movement control of the robot. The movement controller 121a adjusts the data of the received command and transmits the adjusted data to the controller of a designated robot via the communication controller 122a. Also, the movement controller 121a receives data relating to the movement of the robot from the robot via the communication controller 122a and calculates the orientation of the robot. The movement controller 121a transmits the calculated orientation information to the behavior planner 111 and the production controller 113 (shown in FIG. 1). The system controller 121b transmits data relating to the system control of the robot such as starting up, stopping, and ending the controller, etc., to the controller of the robot via the communication controller 122a.

The communication controller 122a performs communication control between the second system 120 and the controller of the robot. The movement controller 121a, the system controller 121b, and the state publishing controller 124a transmit data to the robot via the communication controller 122a. The communication controller 122a performs protocol conversion of the commands issued from the movement controller 121a, the system controller 121b, and the state publishing controller 124a into formats that are received and interpreted by the controller of the robot.

The communication controller 122a may be provided commonly for the movement controller 121a, the system controller 121b, and the state publishing controller 124a or may be provided for each of the movement controller 121a, the system controller 121b, and the state publishing controller 124a.

In the control system 100, the formats of the commands transmitted between the first system 110 and the second system 120 are independent of the control command specifications of the robots. For example, the specification of the commands transmitted between the first system 110 and the second system 120 is different from the control command specifications of the robots.

As an example, any one selected from multiple robots having mutually-different control command specifications is connectable to the control system 100. The format of the commands transmitted between the first system 110 and the second system 120 is common regardless of the control command specification of the robot connected to the control system 100. For example, the control command specifications of the robots 1 to 3 shown in FIG. 1 are different from each other. The format of the commands transmitted between the first system 110 and the second system 120 when the robot 1 is connected to the control system 100 is used commonly and is the same as the format of the commands transmitted between the first system 110 and the second system 120 when the robot 2 is connected to the control system 100.

As another example, multiple control systems 100 are connected respectively to the robots 1 to 3 to control the robots 1 to 3. For example, the format of the commands transmitted between the first system 110 and the second system 120 of the control system 100 connected to the robot 1 is used commonly and is the same as the format of the commands transmitted between the first system 110 and the second system 120 of the control system 100 connected to the robot 2.

Here, the command that is represented using the common specification independent of the control command specifications of the robots connected to the control system 100 as described above is called the "common command" or the "first command".

In the control system 100 according to the embodiment, the first system 110 functions as a common software platform that is independent of the control command specifications of the robots. The second system 120 functions as a controller interface of the robots when viewed from the first system 110.

As one specific example, the publishing and the acquisition of the data is performed in state publishing by conforming to the industrial_msgs::RobotStatus specification of the Robot Operating System-Industrial (ROS-i) and by using a specification for attaching other detailed data. The publishing of the joint angle of the robot arm is performed using the ROS specification sensor_msgs::JointState. The interface of the movement control uses the ROS-i specification trajectory_msgs::JointTrajectory as a basis, and functions such as force control and the like that are not standardized by ROS-i are added. The communication between the second system 120 and the robots is performed using a socket communication function conforming to Transmission Control Protocol/Internet Protocol (TCP/IP) or User Datagram Protocol (UDP).

Specific processing of the control system according to the embodiment will now be described with reference to FIG. 3 to FIG. 5.

Figure 3:
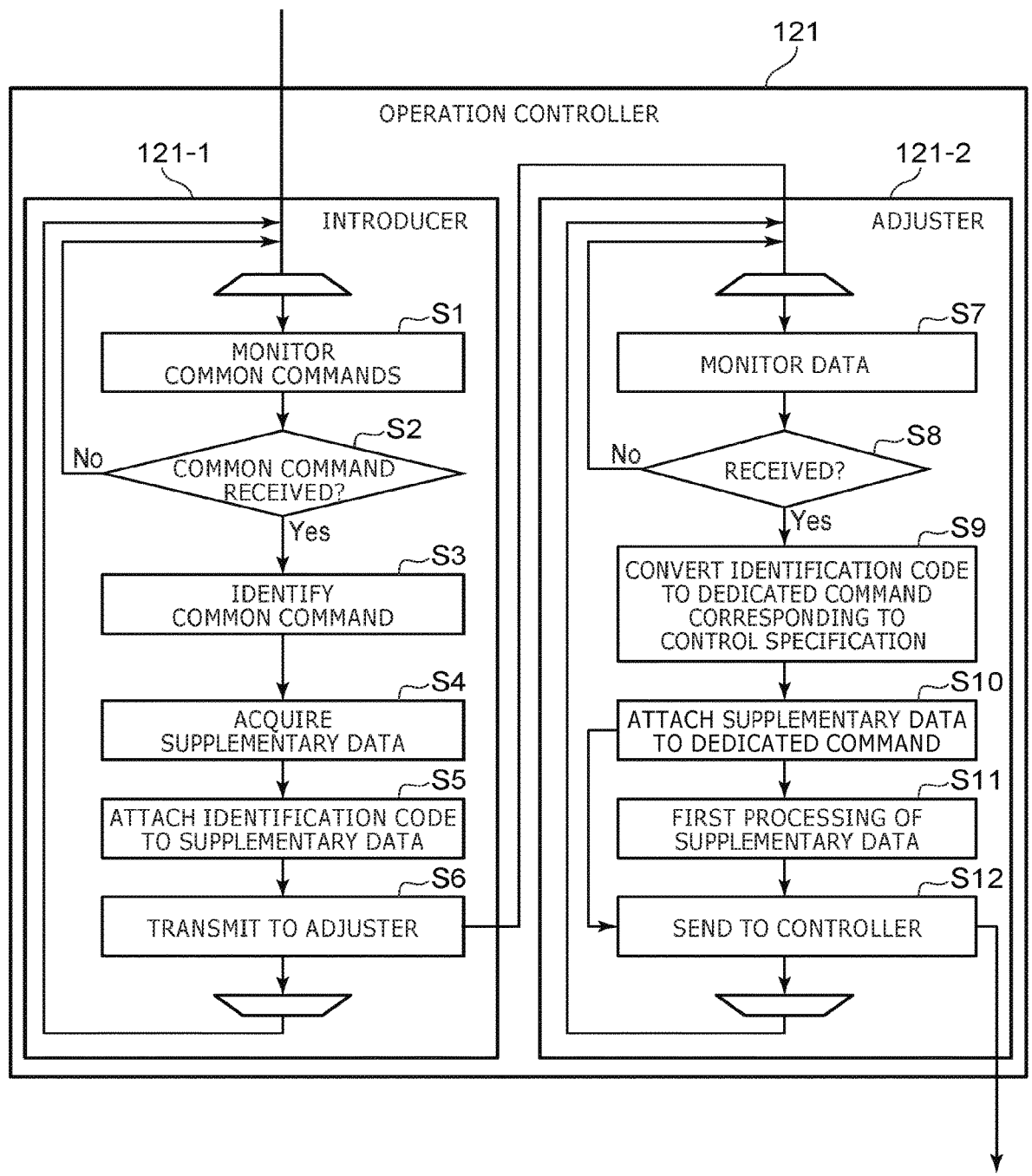
FIG. 3 is a schematic view illustrating specific processing of the control system according to the embodiment.

FIG. 3 is a flowchart illustrating the processing of the control system according to the embodiment. The operation controller 121 functions as an introducer 121-1 and an adjuster 121-2 as illustrated in FIG. 3. The introducer 121-1 handles data of the format independent of the control command specifications of the robots. For example, the introducer 121-1 is independent of a control command specification specified by a designated robot manufacturer, and handles data in which the operations and the behavior expected of the robot are represented using more generalized character strings and/or numerical values. Or, the data that is handled by the introducer 121-1 may be represented according to a control command specification specified by a designated robot manufacturer. In such a case, the introducer 121-1 handles the data of the format according to the control command specification of the designated robot manufacturer regardless of the control command specifications of the robots connected to the control system 100. In other words, the control command specification of the designated robot manufacturer is treated as a common specification for the multiple robots having mutually-different control command specifications. The adjuster 121-2 adjusts the data according to the control command specifications of the robots actually connected to the control system 100.

The common commands for controlling the robots are predefined. For example, the common commands are stored in the memory part 130. The common commands can be defined in a common language independent of the control command specifications of the robots and can be represented using character strings. FIG. 4 is a table illustrating examples of the common commands used in the control system according to the embodiment. As an example, the common commands for controlling the robots are defined as illustrated in FIG. 4. Also, an identification code that corresponds to each common command is set.

Also, supplementary data that is necessary when controlling the robot using the common commands is associated with each common command. The supplementary data is information necessary for the operation control of the robot. The format of the supplementary data also is defined to make the processing of the supplementary data by the adjuster 121-2 easy. For example, the supplementary data and the format of the supplementary data are stored in the memory part 130. FIG. 5 is a table illustrating examples of the formats of the supplementary data used in the control system according to the embodiment. As an example, the format of the supplementary data is defined for each common command as illustrated in FIG. 5.

As described above, when controlling the robot, the behavior planner 111 transmits the common command to the second system 120. As illustrated in FIG. 3, first, the introducer 121-1 regularly monitors whether or not the common command is received (step S1). The introducer 121-1 determines whether or not the common command is received (step S2). When it is determined that the common command is received, the introducer 121-1 identifies the received common command (step S3). The introducer 121-1 acquires an identification code corresponding to the identified common command. The identification code is represented using a format easily processed by the adjuster 121-2 and is used by the adjuster 121-2 to identify the common command. Also, the introducer 121-1 acquires supplementary data corresponding to the identified common command (step S4). The introducer 121-1 attaches the identification code corresponding to the received common command to the supplementary data (step S5). The introducer 121-1 transmits the supplementary data and the identification code to the adjuster 121-2 (step S6).

As illustrated in FIG. 3, first, the adjuster 121-2 regularly monitors whether or not data is received (step S7). The adjuster 121-2 determines whether or not the data is received (step S8). When it is determined that the data is received, the adjuster 121-2 converts the received identification code into a dedicated command (a second command) corresponding to the control command specification of the robot (step S9). The adjuster 121-2 attaches the supplementary data transmitted from the introducer 121-1 to the dedicated command (step S10). The adjuster 121-2 performs first processing of the supplementary data as appropriate (step S11).

The first processing is performed according to the transmitted dedicated command. In the first processing, at least one of attaching additional data to the supplementary data, converting at least a portion of the supplementary data, or deleting a portion of the supplementary data is performed. For example, the additional data includes the definition of the coordinate system of the goal position to which the robot arm moves, the acceleration, etc. Unit conversion, coordinate transformation, etc., are performed when converting at least a portion of the supplementary data. Also, for some types of data, a portion of the data is deleted when the amount that can be received by the controller is limited. For example, when the data of nine axes is transmitted toward the robot from the first system 110 but the controller of the robot can receive only data up to eight axes, the data of one axis is deleted in the first processing.

When the first processing is necessary, the adjuster 121-2 performs the first processing of the supplementary data. After performing the first processing, the adjuster 121-2 transmits the dedicated command and the adjusted supplementary data toward the controller of the robot (step S12). When the first processing is unnecessary, the adjuster 121-2 transmits the dedicated command and the unadjusted supplementary data toward the controller. The communication controller 122a performs protocol conversion of the data transmitted toward the controller and transmits the data to the controller.

Figure 6:
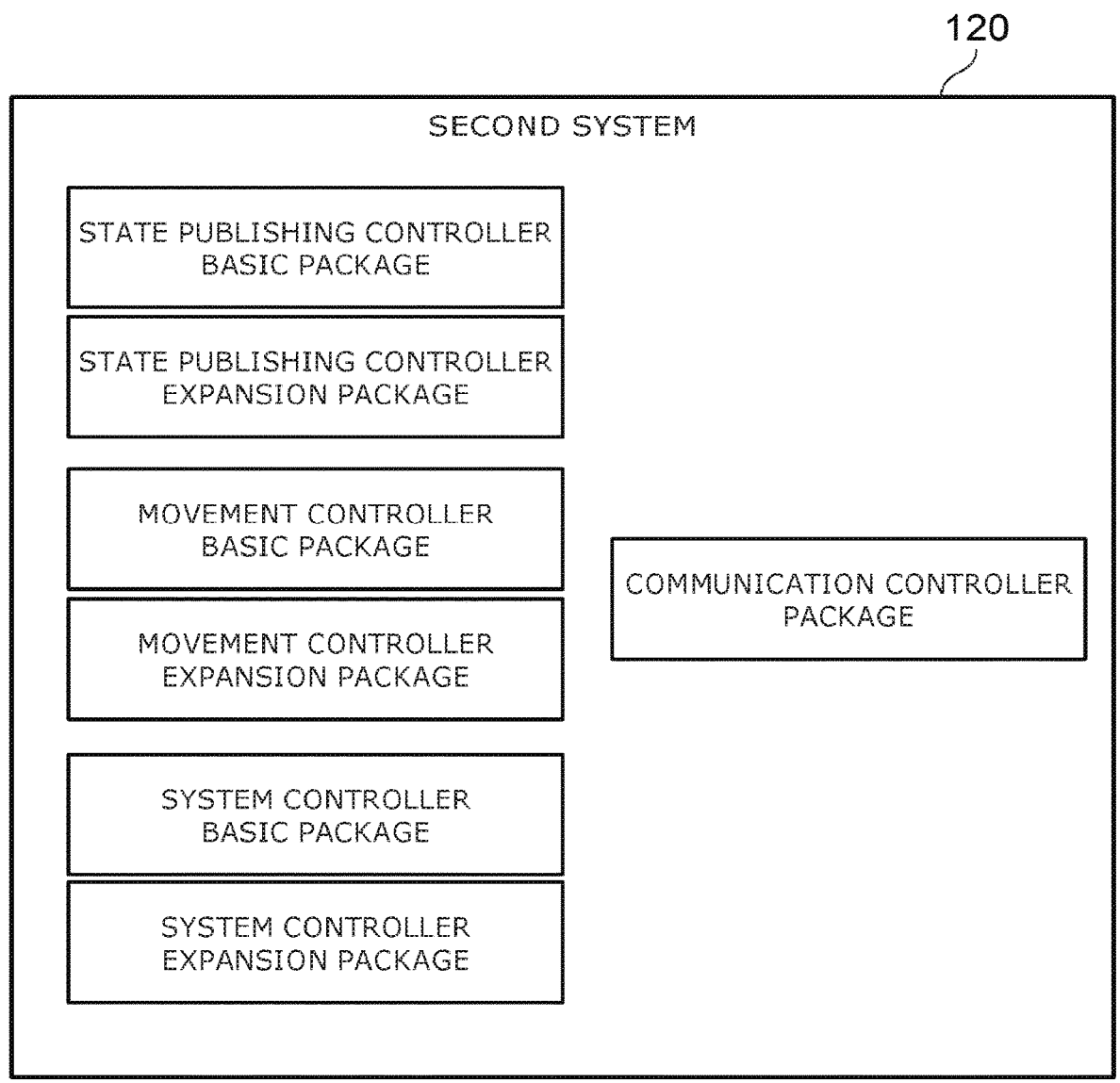
FIG. 6 is a schematic view illustrating a configuration example of the second system of the control system according to the embodiment.

FIG. 6 is a schematic view illustrating a configuration example of the second system of the control system according to the embodiment.

For example, the second system 120 includes packages, which are the ROS software building blocks, for each of the controllers of the second system. In the example of FIG. 6, seven packages are used in the second system 120. Basic packages are prepared for the movement controller 121a, the system controller 121b, and the state publishing controller 124a. An expansion package is prepared for the functions or the settings that need to be added or corrected for each robot. For example, when the control system 100 is connected to a new type of robot, an expansion package is modified (corrected or replaced) as appropriate without modifying the basic package. On the other hand, the package that functions as the communication controller 122a is prepared for each controller to perform the different conversion processing of the controllers of the robots. Thus, it is easy to construct the second system 120 to correspond to the robots by using, in the second system 120, first software which is the basis that is independent of the controllers, and second software that expands the functions of the first software according to the controllers.

The communication controller 122a also may have a function of generating a dummy response. The function of the dummy response is used when the controller of the robot is not connected to the control system 100 when constructing the control system 100. The communication controller 122a returns the response for the dedicated command and the supplementary data toward the first system 110 without actually transmitting the dedicated command and the supplementary data. Thereby, the first system 110 can acquire a response similar to that of the actual robot when constructing the control system 100 even when there are no robots that can respond. For example, the efficiency of debugging when constructing the control system 100, etc., can be increased.

Effects of the Embodiment Will Now be Described.

Conventionally, robots are practically used in routine tasks such as simple assembly tasks, painting, welding, etc. In recent years, applications to fields such as logistics, service industries, etc., also are expanding. For routine tasks, generally, the same type of multiple robots is used because the same tasks are performed repeatedly. Conversely, the need for automating non-routine tasks is increasing in logistics and service industries. For non-routine tasks, tasks that are not fixed are performed. For example, it is necessary for a robot to perform an operation corresponding to conditions based on data acquired by a camera, a sensor, etc. Also, it is effective to use combinations of mutually-different multiple types of robots to be able to accommodate more diverse conditions in non-routine tasks.

When automating multiple robots having mutually-different control command specifications, it is favorable to be able to use common commands independent of the control command specifications of the robots in the higher-level system. For example, an Open Source Software (OSS) library has been developed by the ROS-i consortium to control multiple types of robots by using a common communication interface. By using the OSS library, the higher-level system can control the robots via the common communication interface regardless of the control command specifications of the robots.

However, when the OSS library is used, only the commands that are commonly performable by the robots are transmitted toward the controllers of the robots. Therefore, unique controls of the robots cannot be performed by the commands from the higher-level system. Therefore, the capabilities that are realized by the robots are more limited than the originally-included capabilities. Also, the OSS library cannot be applied to a robot that cannot be adapted to the operating conditions.

In the control system 100 according to the embodiment, the second system 120 generates dedicated commands based on common commands that are used commonly and are independent of the robots. Also, the second system 120 attaches supplementary data to the dedicated command when causing the robot to perform controls corresponding to the dedicated command. The robot refers to the supplementary data when performing the control corresponding to the dedicated command. By referring to the supplementary data, for example, the robot arm can perform a finer operation. Or, the robot can perform a unique control. Or, a control of the robot that cannot be performed using only the dedicated commands converted from the common commands is possible. According to the embodiment, fuller use of the capabilities of the robots can be made when controlling the robots by using a common system.

In the description of the embodiment described above, the introducer 121-1 acquires an identification code corresponding to a common command, and the adjuster 121-2 converts the identification code into a dedicated command. The conversion is not limited to the example; the common command may be converted directly into the dedicated command in the second system 120. However, in such a case, the program for realizing the introducer 121-1 becomes massive compared to the program for realizing the adjuster 121-2. By converting the common command to the dedicated command by using the identification code, an excessively massive program of one functional part can be suppressed. Thereby, the construction and the maintenance of the control system 100 are easier.

Favorably, the second system 120 performs the first processing of the supplementary data. The first processing includes at least one of attaching additional data to the supplementary data, converting at least a portion of the supplementary data, or deleting a portion of the supplementary data. By performing the first processing, the supplementary data is more optimized according to the control command specifications of the robots. As a result, fuller use of the capabilities of the robots can be made.

The control of a robot having a vertical articulated robot arm is complex compared to a horizontal articulated robot arm. Therefore, the data amount of the commands transmitted from the controller to the robot arm also is greater for a vertical articulated robot arm than for a horizontal articulated robot arm. To realize the original capabilities of a vertical articulated robot arm, it is favorable to attach data corresponding to the control of the robot arm to the command. Therefore, the control system 100 according to the embodiment is used favorably for a vertical articulated robot arm. In particular, the control system 100 according to the embodiment is used favorably for a robot arm having six or more drive axes.

Figure 7:
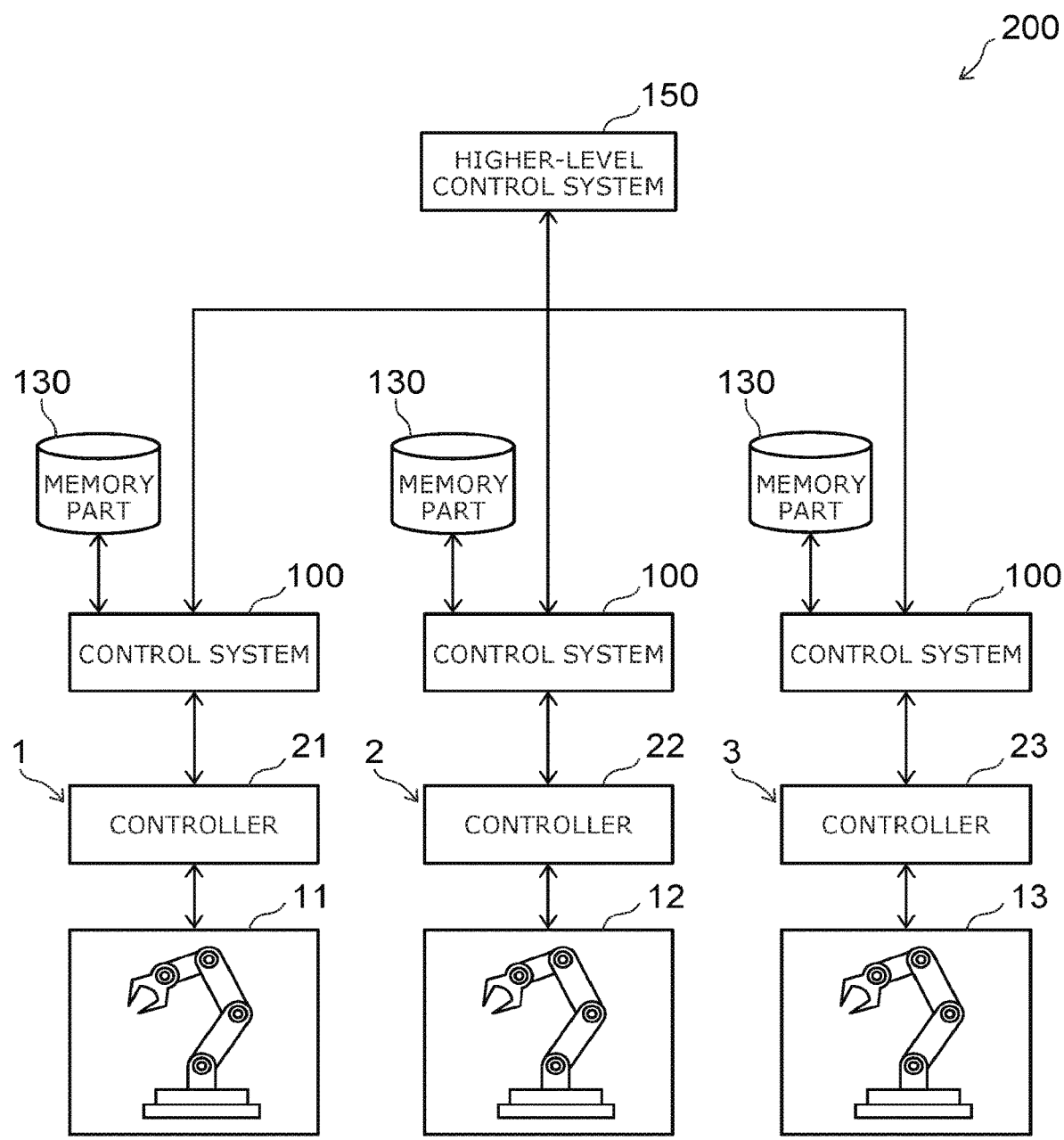
FIG. 7 is a schematic view illustrating a configuration of a robot system according to the embodiment.

FIG. 7 is a schematic view illustrating a configuration of a robot system according to the embodiment.

The robot system 200 according to the embodiment includes the control systems 100, and robots connected to the control systems 100. The example illustrated in FIG. 7 includes the multiple control systems 100 and the multiple robots 1 to 3 connected respectively to the multiple control systems 100.

For example, the control command specifications of the robots 1 to 3 are different from each other. However, even in such a case, the robots 1 to 3 can be controlled using a common control system 100. For example, the control system 100 can accommodate the control command specifications of any of the robots 1 to 3 by correcting or replacing the expansion packages illustrated in FIG. 6 according to the control command specifications of the robots 1 to 3.

In the control system 100 as described above, supplementary data is attached to the dedicated commands transmitted to the controllers of the robots. Therefore, fuller use of the capabilities of the robots can be made. For example, according to the robot system 200, the capabilities of the robots can be increased, and the efficiency, the quality, etc., of the tasks by the robots can be improved.

As illustrated in FIG. 7, the robot system 200 may include a higher-level control system 150 connected to the multiple control systems 100. The higher-level control system 150 comprehensively manages the multiple control systems 100. Also, the higher-level control system 150 causes the control systems 100 to cooperate with each other. For example, thereby, it is easy for multiple robots to collaborate to perform one task.

Figure 8:
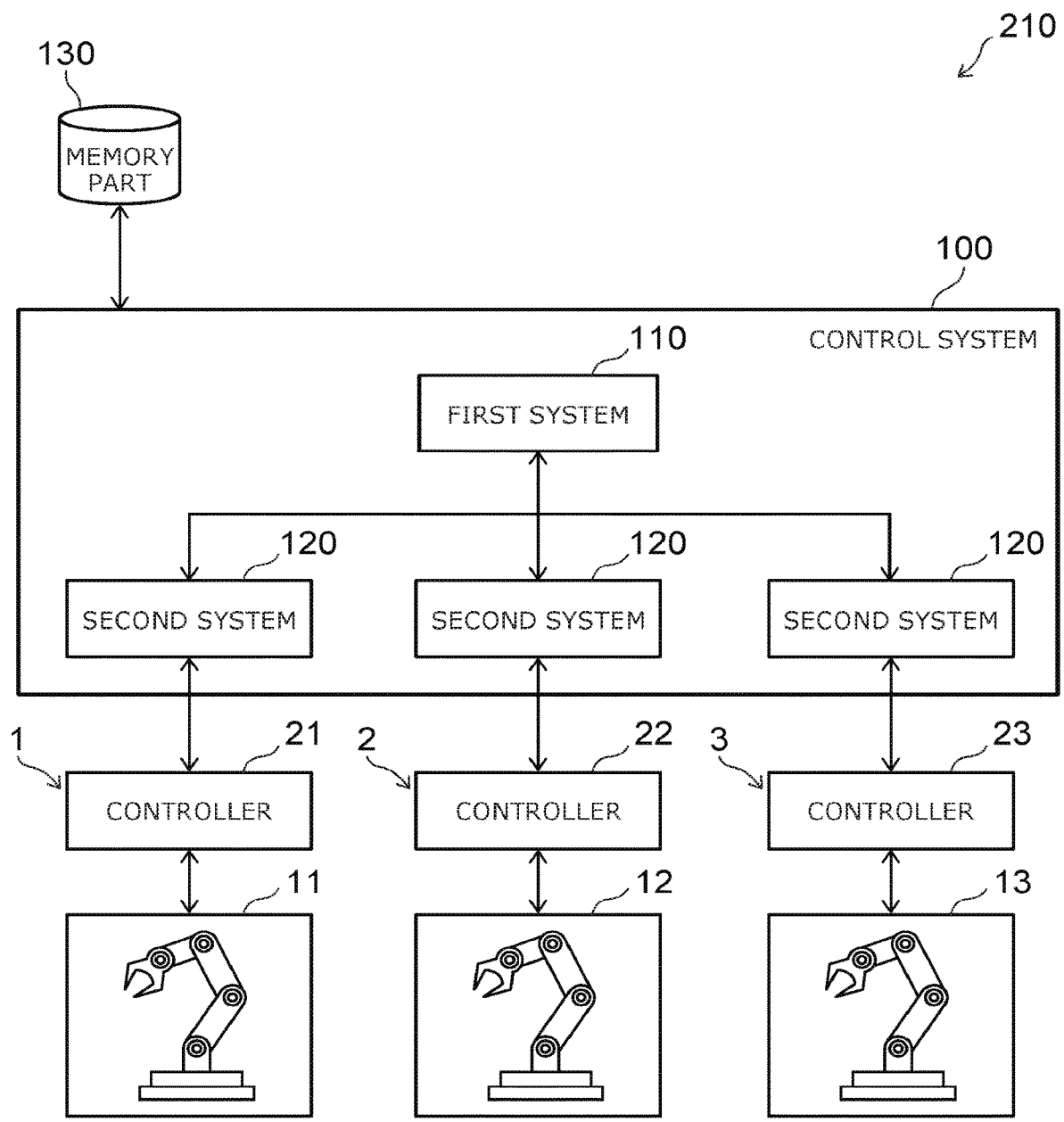
FIG. 8 is a schematic view illustrating a configuration of a robot system according to a modification of the embodiment.

FIG. 8 is a schematic view illustrating a configuration of a robot system according to a modification of the embodiment.

In the robot system 210 illustrated in FIG. 8, the control system 100 includes one first system 110 and multiple second systems 120. Data is transmitted between the first system 110 and the multiple second systems 120. The multiple second systems 120 are connected respectively to the robots 1 to 3.

As illustrated in FIG. 8, it is also possible for the first system 110 to be used commonly by the multiple second systems 120. Thereby, the multiple second systems 120 are managed comprehensively by the first system 110.

Figure 9:
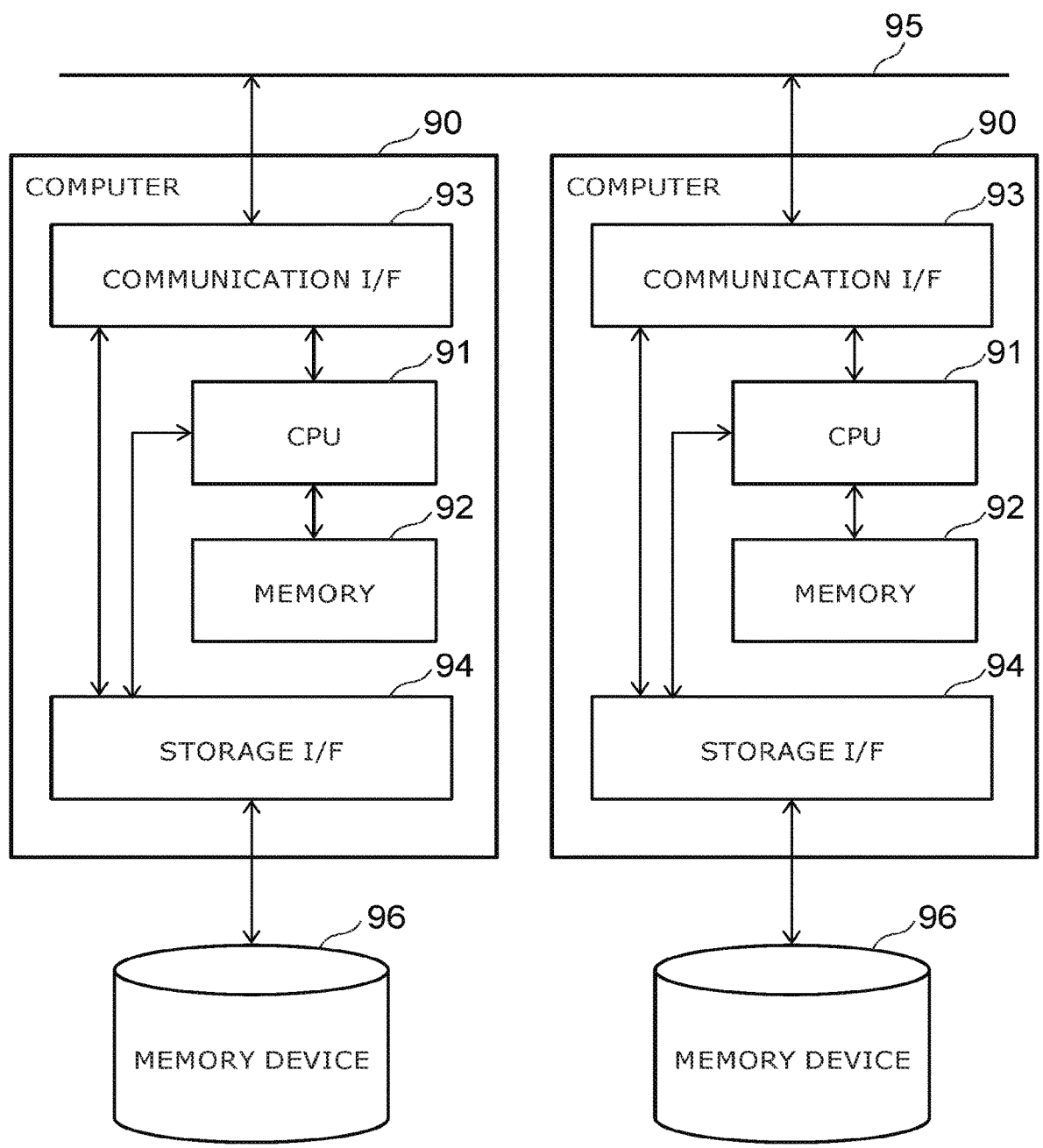
FIG. 9 is a schematic view illustrating a hardware configuration of the control system according to the embodiment.

FIG. 9 is a schematic view illustrating a hardware configuration of the control system according to the embodiment.

As illustrated in FIG. 9, the control system 100 is realized by one or more computers 90. The computer 90 includes a CPU 91, memory 92, a communication interface 93, and a storage interface 94.

The memory 92 stores the programs controlling the operations of the computer 90. The programs that are necessary to cause the computer to function as at least one of the behavior planner 111, the recognizer 112, the production controller 113, the writer 114, the operation controller 121, the communicator 122, the setting controller 123, or the state monitor 124 described above are stored in the memory 92. The programs may be subdivided by function or may be subdivided at the source-code level.

The computers 90 are connected to a network 95 via the communication interface 93. For example, the control system 100 is realized by the collaboration of multiple computers 90 by the multiple computers 90 transmitting and receiving data via the network 95.

The computer 90 is connected to a memory device 96 via the storage interface 94. The memory device 96 is used as the memory part 130. The memory device 96 may be embedded in the computer 90.

According to the control system, the control method, and the robot system according to the embodiments described above, fuller use of the capabilities of the robots can be made. Also, similar effects can be obtained by using a program for causing a computer to operate as the control system.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

At least a portion of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium according to the embodiments stores a program that can cause a computer to execute the processing of the various information recited above. The recording medium according to the embodiments also includes a recording medium to which a program is downloaded and stored using a LAN, the Internet, etc. The processing recited above may be performed based on multiple recording media.

The computer according to the embodiments includes one or multiple devices (e.g., personal computers, etc.). The computer according to the embodiments may include multiple devices connected by a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A control system sending a command to a robot and causes the robot to perform an operation according to the command, the control system comprising:
    a first system transmitting a first command and supplementary data, the first command being represented using a specification different from a control command specification used by a controller of the robot, the first command being sent to cause the robot to perform a predetermined operation according to the first command, the supplementary data corresponding to the first command and including specifics used in the predetermined operation; and
    a second system generating a second command based on the first command, attaching the supplementary data to the second command, and transmitting the second command to the controller, the second command corresponding to the control command specification.

2. The control system according to claim 1, wherein the second system includes an introducer and an adjuster, when receiving the first command and the supplementary data, the introducer acquires an identification code corresponding to the first command, attaches the identification code to the supplementary data, and transmits the supplementary data to the adjuster, the identification code being identifiable by the adjuster, and
    the adjuster converts the received identification code into the second command, attaches the supplementary data to the second command, and transmits the second command to the controller.

3. The control system according to claim 1, wherein first processing is performed when attaching the supplementary data to the second command, the first processing including at least one of attaching additional data to the supplementary data, converting at least a portion of the supplementary data, or deleting a portion of the supplementary data.

4. The control system according to claim 1, wherein the second system includes a communicator, and
    the communicator transmits, to the controller, the second command having the supplementary data attached after converting the second command having the supplementary data attached into a format receivable by the controller.

5. The control system according to claim 1, wherein
first software and second software are used in the second system, the second software expanding a function of the first software,
the first software and the second software are stored in a non-transitory computer-readable storage medium, and
the second software is modified according to the controller.

6. A robot system, comprising:
the control system according to claim 1; and
the robot connected to the control system.

7. The robot system according to claim 6, wherein
the robot includes a robot arm that is vertical and articulated.

8. The robot system according to claim 6, comprising:
a plurality of the control systems; and
a plurality of the robots connected to the plurality of control systems,
the control command specifications used by the controllers of the plurality of robots being different from each other.

9. A control method of controlling a robot by sending a command to a robot and causing the robot to perform an operation according to the command, the method comprising:
transmitting a first command and supplementary data from a first system, the first command being represented using a specification different from a control command specification used by a controller of the robot, the first command being sent to cause the robot to perform a predetermined operation according to the first command, the supplementary data corresponding to the first command and including specifics used in the predetermined operation; and
in a second system, generating a second command based on the first command, attaching the supplementary data to the second command, and transmitting the second command to the controller, the second command corresponding to the control command specification.

10. The method according to claim 9, wherein
in an introducer of the second system, an identification code corresponding to the first command is acquired, the identification code is attached to the supplementary data, and the supplementary data is transmitted to an adjuster of the second system, the identification code being identifiable by the adjuster, and
in the adjuster, the received identification code is converted into the second command, the supplementary data is attached to the second command, and the second command is transmitted to the controller.

11. The method according to claim 9, wherein
first processing is performed when attaching the supplementary data to the second command, the first processing including at least one of attaching additional data to the supplementary data, converting at least a portion of the supplementary data, or deleting a portion of the supplementary data.

12. A non-transitory computer-readable storage medium storing a program causing a computer to control a robot by sending a command to a robot and causing the robot to perform an operation according to the command,
the program causing the computer to function as:
a first system transmitting a first command and supplementary data, the first command being represented using a specification different from a control command specification used by a controller of the robot, the first command being sent to cause the robot to perform a predetermined operation according to the first command, the supplementary data corresponding to the first command and including specifics used in the predetermined operation; and
a second system generating a second command based on the first command, attaching the second command to the supplementary data, and transmitting the second command to the controller, the second command corresponding to the control command specification.

13. The non-transitory computer-readable storage medium according to claim 12, wherein
the program causes the computer to function as the second system further including an introducer and an adjuster,
when receiving the first command and the supplementary data, the introducer acquires an identification code corresponding to the first command, attaches the identification code to the supplementary data, and transmits the supplementary data to the adjuster, the identification code being identifiable by the adjuster, and
the adjuster converts the received identification code into the second command, attaches the supplementary data to the second command, and transmits the second command to the controller.

14. The non-transitory computer-readable storage medium according to claim 12, wherein
the program causes the computer to perform first processing when the supplementary data is attached to the second command, the first processing including at least one of attaching additional data to the supplementary data, converting at least a portion of the supplementary data, or deleting a portion of the supplementary data.

* * * * *